United States Patent [19]

Stengelin

[11] 3,777,891
[45] Dec. 11, 1973

[54] TRICKLING FILTER PLANT
[76] Inventor: Johann Conrad Stengelin, Ohere Vorstadt 21, Tuttlingen, Germany
[22] Filed: May 18, 1971
[21] Appl. No.: 144,615

[52] U.S. Cl. .............................. 210/150, 210/331
[51] Int. Cl. ............................................ B01d 33/28
[58] Field of Search ............... 210/150, 151, 331; 261/92

[56] References Cited
UNITED STATES PATENTS
3,630,366  12/1971  Joost ................................ 210/150
3,389,798   6/1968  Hartmann et al. ............... 210/150
1,057,475   4/1913  Young .............................. 210/331
2,772,000  11/1956  Hunziker ..................... 210/331 X
2,894,632   7/1959  Myers ............................. 210/331
2,932,402   4/1960  Logue et al. ................ 210/331 X Primary Examiner—John Adee
Attorney—Craig, Antonelli and Hill

[57] ABSTRACT

A trickling filter plant consisting of several circular plates immersed into a tank to about half their diametric height and mounted on a drive shaft; the individual plate is thereby composed of several sectors fastened to radial struts secured to the drive shaft and combined into stacks by bolts extending through reinforced spacer cams provided on the sectors.

21 Claims, 11 Drawing Figures

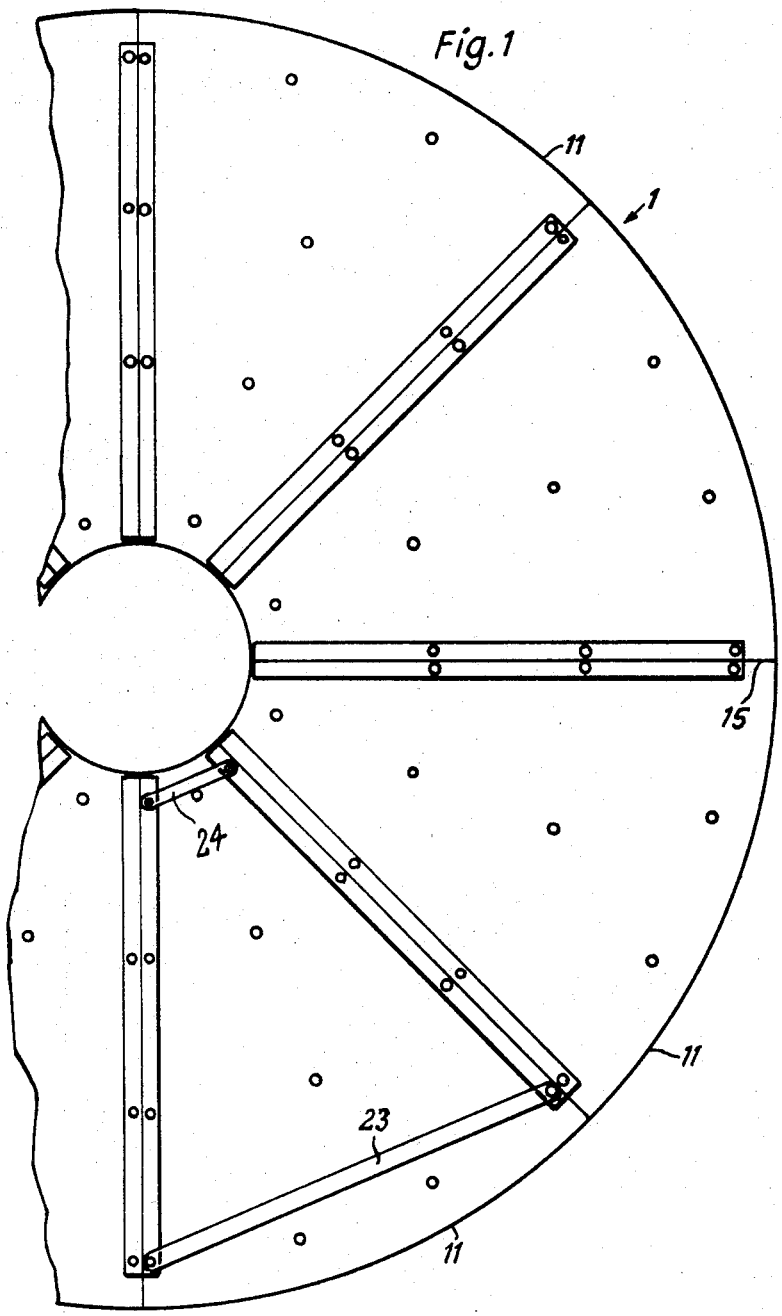

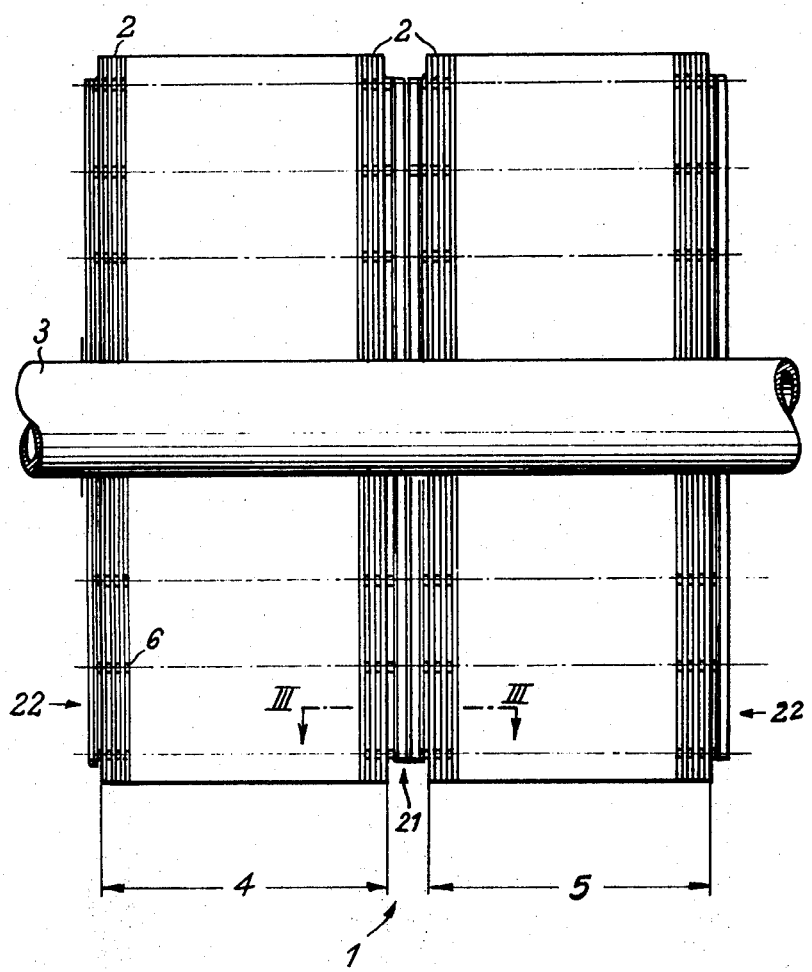

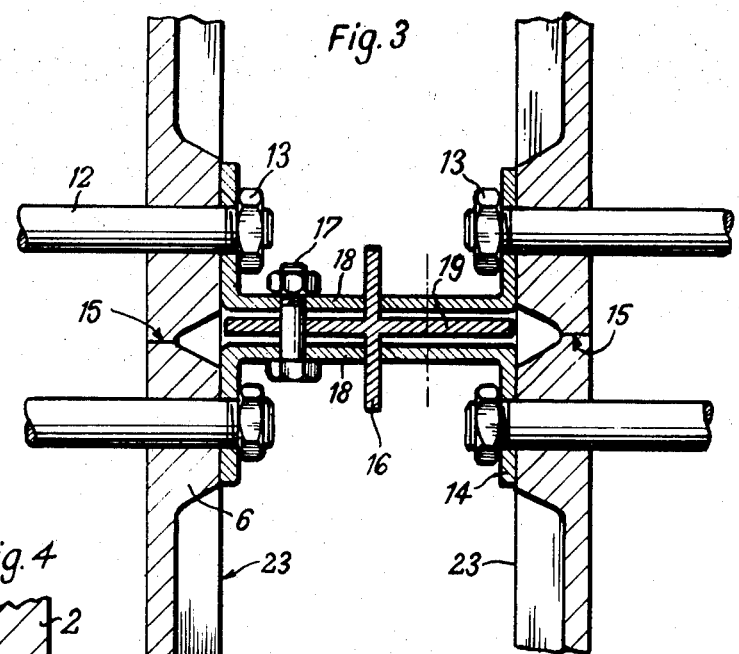
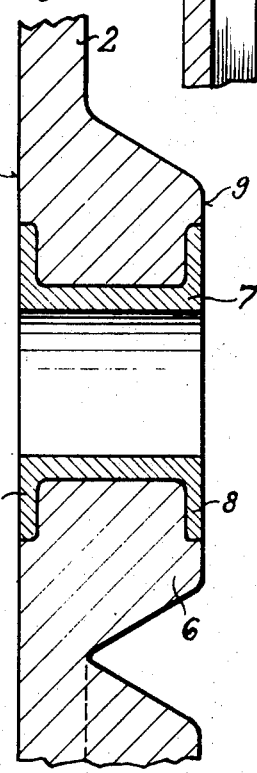
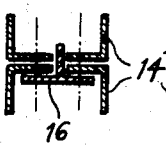
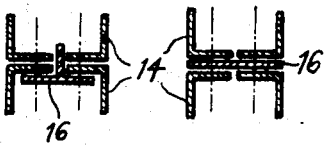
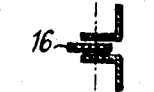
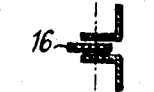
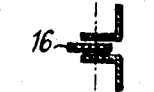

TRICKLING FILTER PLANT

This invention relates to a trickling filter plant for the purification of waste water, with at least one trickling filter consisting of several circular plates which are immersed in a trickling filter tank to approximately half their diameter, and which are coaxially arranged on a drivable shaft supported in at least two bearings and are separated from one another by spacer cams made in one piece, i.e., integrally with the plates.

Such disc-type trickling filters may be made from various materials. Predominantly, however, synthetic resin is employed for the manufacture thereof, namely foamed synthetic resin, such as "Styropor" which is a commercially available foamed polystyrene. Since the efficiency of a purification plant operated with trickling filters depends on the total surface area of the sum of the individual disks, it is desirable to accommodate on one shaft as many disks as possible, which are also to be as large as possible. However, for reasons of transportation and due to the fragility of the foamed material employed, the desired plate size is limited. These waste water purification plates are often operated in halls, the capacity of which is advantageously utilized only if very large plates are employed.

It is an object of the present invention to combine, in a sturdy plate construction, the desirable but actually contradictory properties required for a satisfactory, optimally usable plant.

This object is solved, according to the invention, in that each plate is composed of several sector elements which are attached to struts radially mounted on the shaft and are combined, by means of bolts extending through reinforced spacer cams, into plate stacks, especially into plate sector stacks. In this connection, it is advantageous to incorporate, by foaming, spacer sleeves of a synthetic resin having a higher strength into the spacer cams of the plates consisting of foamed plastic; bolts thereby extend at least partially through these spacer sleeves and nuts are threadedly connected to the ends of the bolts. Care should be taken that the sector sections are still of such a size that they can yet be accommodated in so-called containers, by means of which the sensitive plate sections can be transported without any danger on the road, by rail, or by ship. However, this specific requirement is also met by combining the sector sections into plate sector packs which can readily be mounted as a whole on the shaft at the site where they will be utilized.

For this purpose, particular constructions are especially advantageous, by means of which the plate sector baffles disposed one behind the other in the axial direction of the shaft can be combined into a plate sector pack.

In these constructions, the plate sector packs advantageously include angle irons extending in each case along the edges of the sector element, and these angle irons can be threadedly connected with corresponding adjacent angle irons of a following plate sector pack, to radial struts welded to the shaft, along which the angle irons are guided, which connection is effected at the ends of these struts. These struts may be cross-shaped, T-, I-, or U-shaped in cross section or may be constructed as flat irons, so that the plate stacks can be inserted between respectively two or four struts and can be secured by means of bolts at the ends of the struts.

In order to reinforce an individual plate sector pack, tie-rods may then be threadably secured in addition thereto.

These and other objects, features and advantages of the present invention will become more apparent from the following description when taken in conjunction with the accompanying drawing which shows, for purposes of illustration only, several embodiments in accordance with the present invention, and wherein FIG. 1 is a partial side view of a trickling filter in accordance with the present invention;

FIG. 2 is a plan view of a trickling filter, in which only those portions of the plate pack are illustrated mounted on a shaft which are disposed above and below the shaft on which the pack is mounted;

FIG. 3 is a cross sectional view, on an enlarged scale, of trickling filter parts taken along line III—III in FIG. 2;

FIG. 4 is a cross sectional view, on an enlarged scale, of part of a trickling filter plate within the area of a spacer cam;

FIGS. 5–7 are cross sectional views of struts and angle irons threadedly connected therewith between two plate packs; and FIGS. 8–11 are cross sectional views of struts and angle irons threadedly connected therewith at the edge of a plate pack.

Referring now to the drawing wherein like reference numerals are used throughout the various views to designate like parts, the trickling filter plant according to this invention consists of a trickling filter body generally designated by reference numeral 1 which is inserted into a basin adapted to the circular shape of the body 1 in such a manner that the plates 2 are immersed to approximately half their diameter and the waster water to be purified can flow through the trickling filter plates at right angles to the longitudinal direction of the shaft 3, which in this embodiment is constructed as a hollow shaft. The shaft 3, on which the individual plates 2 are arranged coaxially, is supported in conventional manner on two bearings arranged outside of the plate packs 4 and 5 and can be set into rotation slowly by means of a motor (not shown). The plates mounted on the shaft 3 are made of a foamed plastic and are separated from one another along the shaft 3 by spacer cams 6 made integrally, i.e., in one piece with the plate during the manufacture thereof.

These spacer cams 6 are provided with spacer sleeves 7 (FIG. 4) made of a harder, impact- and pressure-resistant synthetic resin, which spacer sleeves 7 are incorporated by foaming into the spacer cams 6. The spacer sleeves 7 include flanges 8 at their ends, which are flush with the outer surfaces 9 of the spacer cams.

Each individual plate 2 of the embodiment illustrated herein is composed, as shown in FIG. 2, of eight sector elements 11. A large number of sector elements is arranged one behind the other (in the axial direction of the shaft 3) and combined into a plate sector pack. These plate sector packs are held together by bolts 12 (FIG. 3) extending through the spacer cams 6 as well as the spacer sleeves 7; nuts 13 are threadedly connected to the ends of these bolts 12 provided thereat with a thread. The bolts 12, however, also extend through angle irons 14 which, in each case, extend along the sector edges 15 of the outer plates of a plate sector pack and thus protect and reinforce these edges.

These angle irons 14 furthermore serve for the guidance of the plate sector packs and for the fastening of the latter to struts 16 radially welded to the shaft 3. For the plate sector packs are fixedly mounted by threaded connection to the ends of these struts after the packs have been inserted between respectively four struts. The threaded bolts 17 extend through the adjacent webs 18 of the angle irons 14 of adjacent plate sector packs and through the flanges 19 of the struts present thereat, which flanges extend along or between these webs.

FIGS. 5–11 show schematically the cross sections of possible structures of the struts 16, together with the angle irons 14 threadably connected thereto, namely in the center 21 (FIG. 2) between two plate packs, in FIGS. 5–7, as well as at the end faces 22 (FIG. 2), in FIGS. 8–11. It can be seen therefrom that the struts 16 can have angular, flat-iron-shaped, I-, T-, or U shaped or possibly also still other different cross sections.

Each plate sector pack can be provided, toward the outside and/or toward the inside, with anchoring elements 23, 24 connecting the ends of the angle irons 14.

The thus-produced plate sector packs can still be shipped in containers in a satisfactory manner safe from damage; they can also be readily mounted at the actual site by insertion between the struts 16 and threadedly connected thereto. Also, damaged plate sector pieces can be readily exchanged and replaced.

In case of larger plants, it is also possible to mount on a larger shaft a still greater number of plate packs than illustrated in FIG. 2. In that case, several bearings are then provided and the shaft is supported, in addition to being supported at its ends outside of the plate packs, also between these packs by means of the necessary number of bearings disposed between these packs whereby the packs, of course, have a somewhat larger spacing in such case.

While I have shown and described several embodiments in accordance with the present invention, it is understood that the latter is not limited thereto but is susceptible of numerous changes and modifications as known to those skilled in the art, and I therefore do not wish to be limited to the details shown and described herein but intend to cover all such changes and modifications as are within the scope of those skilled in the art. What I claim is:

1. A trickling filter plant for use in a waste water purification immersion tank comprising a plurality of circular plates, each plate including a plurality of sector elements, said plates being separated from one another by spacer cam means, and being combined into plate packs by means extending through said cam means, a drivable shaft means for supporting said plurality of plates in the tank to a depth of approximately half the diameter of said plates, and a plurality of strut means radially secured to said shaft for supporting said sector elements.

2. A trickling filter plant according to claim 1, characterized in that said cam means are integral with a respective plate and are reinforce.

3. A trickling plant according to claim 1, characterized in that said plurality of plates are constituted of a synthetic resin.

4. A trickling filter plant according to claim 3, characterized in that reinforcing spacer sleeve means of a different synthetic resin having a higher strength than that of said plates, are foamed-in into the spacer cam means, and in that said means are bolts extending at least partially through the sleeve means and nuts are threadedly connected to the ends of the bolts.

5. A trickling filter plant according to claim 4, characterized in that the spacer sleeve means include flange means at their ends, which are flush with the outer surfaces of the spacer cam means.

6. A trickling filter plant according to claim 5, characterized in that at least several of the plurality of plate sector elements are disposed one behind the other in the axial direction of the shaft forming a plate sector pack.

7. A trickling filter plant according to claim 6, characterized in that the plate sector packs include angle iron means extending in each case along the sector edges, adjacent angle iron means of adjacent plate sector packs extending along a radial strut means secured to the shaft and threadedly connected to the end of the strut means.

8. A trickling filter plant according to claim 7, characterized in that the ends of at least one side of the angle iron means of one plate pack are connected with each other by anchoring means.

9. A trickling filter plant according to claim 7, characterized in that the strut means are constructed with a cross-section of a cross-like shape, and in that the angle iron means extending along the sector edges are threadedly connected to flanges of the profile of the strut means, said flanges extending in the axial direction of the shaft.

10. A trickling filter plant according to claim 7, characterized in that the strut means are constructed with a cross-section of a T-shape, and in that the angle iron means extending along the sector edges are threadedly connected to flanges of the profile of the strut means, said flanges extending in the axial direction of the shaft.

11. A trickling filter plant according to claim 7, characterized in that the strut means are constructed with a cross-section of an I-shape, and in that the angle iron means extending along the sector edges are threadedly connected to flanges of the profile of the strut means, said flanges extending in the axial direction of the shaft.

12. A trickling filter plant according to claim 7, characterized in that the strut means are constructed with a cross-section of a U-shape, and in that the angle iron means extending along the sector edges are threadedly connected to flanges of the profile of the strut means, said flanges extending in the axial direction of the shaft.

13. A trickling filter plant according to claim 7, characterized in that the strut means are constructed with a cross-section of a flat-iron shape, and in that the angle iron means extending along the sector edges are threadedly connected to flanges of the profile of the strut means, said flanges extending in the axial direction of the shaft.

14. A trickling filter plant according to claim 1, characterized in that at least several of the plurality of plate sector elements are disposed one behind the other in the axial direction of the shaft forming a plate sector pack.

15. A trickling filter plant according to claim 14, characterized in that the plate sector packs include angle iron means extending in each case along the sector edges, adjacent angle iron means of adjacent plate sector packs extending along a radial strut means secured to the shaft and threadedly connected to the end of the strut means.

16. A trickling filter plant according to claim 15, characterized in that the ends of at least one side of the angle iron means of one plate pack are connected with each other by anchoring means.

17. A trickling filter plant according to claim 15, characterized in that the strut means are constructed with a cross-section of a cross-like shape, and in that the angle iron means extending along the sector edges are threadedly connected to flanges of the profile of the strut means, said flanges extending in the axial direction of the shaft.

18. A trickling filter plant according to claim 15, characterized in that the strut means are constructed with a cross-section of a T-shape, and in that the angle iron means extending along the sector edges are threadedly connected to flanges of the profile of the strut means, said flanges extending in the axial direction of the shaft.

19. A trickling filter plant according to claim 15, characterized in that the strut means are constructed with a cross-section of an I-shape, and in that the angle iron means extending along the sector edges are threadedly connected to flanges of the profile of the strut means, said flanges extending in the axial direction of the shaft.

20. A trickling filter plant according to claim 15, characterized in that the strut means are constructed with a cross-section of a U-shape, and in that the angle iron means extending along the sector edges are treadedly connected to flanges of the profile of the strut means, said flanges extending in the axial direction of the shaft.

21. A trickling filter plant according to claim 15, characterized in that the strut means are constructed with a cross-section of a flat-iron shape, and in that the angle iron means extending along the sector edges are threadedly connected to flanges of the profile of the strut means, said flanges extending in the axial direction of the shaft.

* * * * *